United States Patent Office 3,335,280
Patented Aug. 8, 1967

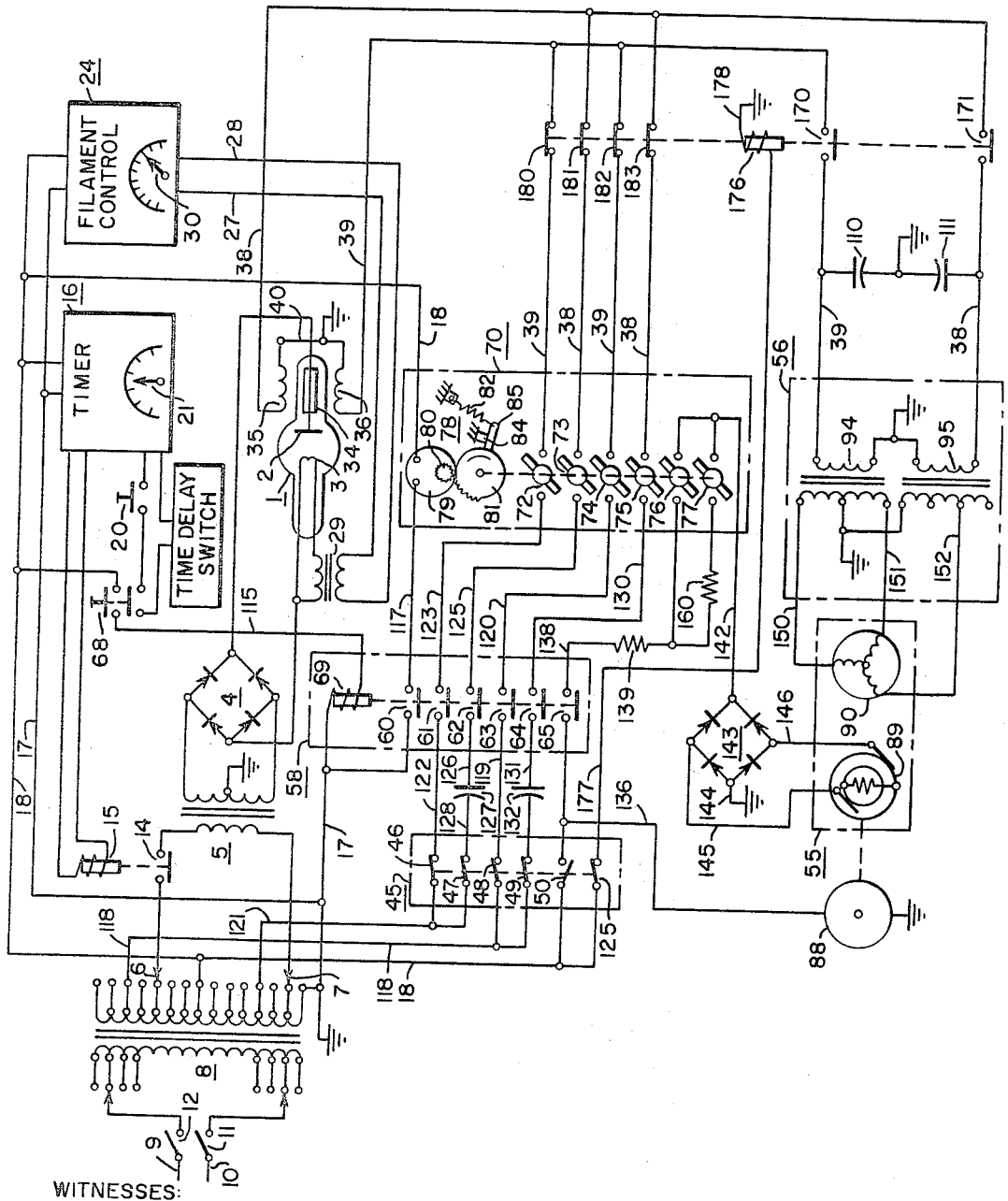

3,335,280
TWO SPEED ROTARY ANODE X-RAY TUBE DRIVEN BY A TWO-PHASE INDUCTION MOTOR
Robert L. Wright, Jr., North Linthicum, Md., assignor to Westinghouse Electric Corporation, Pittsburgh, Pa., a corporation of Pennsylvania
Filed Sept. 9, 1964, Ser. No. 395,225
6 Claims. (Cl. 250—93)

The present invention relates to X-ray apparatus and, more particularly, to apparatus for controlling and operating rotating anode X-ray tubes.

Rotating anode X-ray tubes have long been used in the art. They have an anode rotated by a squirrel cage rotor as part of a two-pole, two-phase induction motor having a main winding and an auxiliary winding. Until recently all such motors were capable of being driven at a maximum operating speed of only about 3000 r.p.m. This is done by supply of sixty-cycle (60 c.p.s.) single-phase alternating current to the two windings, with the one winding phase shifted by a series capacitor.

Recently, in behalf of increasing the permissible loading of these tubes, manufacturers have made available X-ray tubes with anodes to be driven at an operating speed of about 10,000 r.p.m. by a two-pole, two-phase squirrel cage motor operated by a 180-cycle (180 c.p.s.) alternating current source.

Unfortunately, these ultra-speed tubes tend to be slower to start up, and have a shorter bearing life than the tubes operated at the slower rotary speeds.

Accordingly, it is an object of the present invention to provide rotary-anode-X-ray-tube control circuit means which provides for: operation of the X-ray tube at a low speed as well as a high speed, according to the loading on such tube, and rapid start-up regardless of the tube speed which has been selected.

In accord with the foregoing, such circuit means generally includes, tube speed mode selector switch means, tube motor start-stop switch means correlated with exposure-initiating switch means, and a startup timing switch means. The tube speed mode selector switch means provides for selection of either a 60-cycle source or a 180-cycle source for operating the X-ray tube motor at low and high speeds, respectively. The tube motor start-stop switch means controls the electrical connection and disconnection of the selected source to the tube motor. The startup timing switch means automatically effectuates a reduction in current supply to the X-ray tube motor after fast start-up.

In addition to the preceding desiderata, the means heretofore employed for providing a source of 180-cycle two-phase supply of electrical energy to operate the X-ray tube motor at high speed, have been relatively high in initial cost and/or less than desirably reliable in performance. Among such prior art 180-cycle sources used for high speed operation of X-ray tube motors are two-phase motor-generator sets and inverters.

Accordingly, it is an object of the present invention to provide, in rotating anode X-ray tube circuitry, a relatively inexpensive and reliable source of 180-cycle two-phase current for operating the X-ray tube motor at high speed.

This latter object is obtained, in general, by use of a relatively low cost motor-operated three-phase low-voltage alternator in conjunction with a Scott-connected transformer assemblage to convert the three-phase alternator output to two-phase and multiply the voltage for operation of the X-ray tube motor. In addition, the present invention comprises circuit means for placing the alternator in readiness for effecting supply to the X-ray tube motor by driving the alternator without field energization so long as the tube speed mode selector switch means is set for the high speed mode, and making the 180-cycle alternator output instantly available by excitation of its field just prior to initiating an X-ray exposure.

Other objects, features and advantages of the invention will become apparent from the following detailed description, when taken in connection with the accompanying drawing in which the single figure is a circuit diagram of X-ray apparatus embodying the invention.

Referring to the drawing, a typical X-ray apparatus in which the invention is embodied comprises an ultra-speed rotating anode X-ray tube 1 having a rotating anode 2 and a cathode or filament 3. High voltage direct current is made available between anode 2 and filament 3 for operating the X-ray tube 1 by means of the usual rectifier bridge 4, high voltage transformer 5, and adjustable kv. selector taps 6, 7 on the main transformer 8, which is usually an autotransformer but is shown herein with an insulated secondary winding for sake of convenience. Main leads 9 and 10 under control of line switches 11 and 12 serves to avail the main transformer of supply of such as 220 volt, 60-cycle, single phase alternating current. The primary winding of the high voltage transformer 5 is connected in series with a main switch 14 operated by a relay winding 15 controlled by the usual timer 16 to determine the duration of an X-ray exposure resulting from high voltage energization of the X-ray tube 1. The timer 16 is operated via leads 17 and 18 from suitable taps on the main transformer secondary. By depressing and holding a manually-operated exposure-initiating push button switch 20, the timer 18 is brought into operation to permit the switch 14 to remain closed until expiration of a pre-selected time determined by adjustment of a time selector knob 21. A well-known filament control circuit 24 provides for control of the current through the filament 3 of the X-ray tube, usually referred to as ma., via leads 27 and 28 and the usual filament transformer 29, according to position of an adjustable ma. selector knob 30. The loading of the X-ray tube is a function of the kilovoltage, kv., applied to it, the filament current ma., and the exposure time, S. According to selection of these three values, it can be determined, from such as a manufacturer'e tube rate chart, at which speed the anode 2 of the X-ray tube 1 should be rotated.

The two-phase induction motor for rotating the anode 2 of the X-ray tube 1, per conventional construction, comprises a squirrel cage rotor 34 disposed within the evacuated envelope of the tube and coupled to drive such anode, together with two field coils 35 and 36 outside the tube envelope in encirclement of the rotor to develop a magnetic field for turning same. In accord with the usual practice, the two coils are availed of two-phase alternating current via respective motor leads 38 and 39 and a lead 40 common to each of the field coils, which common lead, in the present apparatus conveniently is connected to a ground to which one end of the secondary of the transformer 8 also is connected.

In accord with providing for two-speed operation of the X-ray tube 1, the apparatus of the present invention in general comprises a tube speed mode selector switch means 45 which, as a schematic illustration, may simply comprise a plurality of ganged manually-operated switches 46 to 50 positionable according to which of the two X-ray tube anode speeds is desired, to establish selective conditions for tube motor operation either from a 60-cycle single-phase source at the transformer 8 secondary or a 180-cycle two-phase supply from an alternator 55 and Scott-connection transformer assemblage 56. In practice, it may be practical and convenient to divide the selector switch means 45 into a number of separate relay switch devices which may operate in unison or sequentially while serving the same overall functions of the switch means 45 as will be described hereinafter.

The apparatus further comprises a tube motor start-stop switch means 58, which, as exemplified for sake of simplified illustration, comprises a plurality of ganged switches, 60 to 65, operated by a relay coil 69 under the control of an operator's "Ready" push button switch 68, to effectuate operation of the X-ray tube motor according to dictates of the speed mode selector switch means 45.

Finally, in general, the apparatus also includes a start-up timing switch means 70, which, in behalf of simplified illustration, comprises a plurality of ganged rotary switches 72 to 77, operated by a clock motor mechanism 78, for effecting supply of tube motor operating current initially at a high voltage for rapid start-up and, after a timed interval, at a reduced voltage for subsequent running at the selected speed. The clock motor mechanism 78, for example, may comprise a clock motor and gear assemblage 79 including a pinion 80 which is turned by the clock motor when energized but is free to be turned reversely and externally when the clock motor is de-energized. The pinion 80 meshes with a partial gear 81 which is coupled to the switches 72 to 77 to impart limited turning movement thereof at a controlled rate against the bias of a return spring 82. Turning movement is limited by the arcuate length of the toothed portion of the partial gear 81, and the spring 82 returns the switches 72 to 77 to their repose positions by reverse turning of gear 81 and pinion 80 upon de-energization of the clock motor. A stop 84 cooperates with an arm 85 on the gear 81 to define such repose positions.

In accord with detailed features of the invention, the 180-cycle two-phase A.C. supply for operating the X-ray tube motor at high speed comprises the low voltage three-phase alternator 55 and the Scott-connection transformer assemblage 56. By virtue of use of this combination of components the cost of such a supply is minimized in that low voltage three-phase alternators are available commercially at modest prices for use in automobile battery charging systems, the Scott-connection transformer assemblage 56 is of moderate cost, as also is a motor 88 for operating the alternator.

In further detail, the three-phase alternator of the present invention is one with a rated output of about sixty amperes and about twelve volts. It usually has twelve poles and is made to generate 180-cycles by rotating its field 89 at 1800 r.p.m. In accord with a feature of the invention, the alternator field 89 is preferably externally excited in order to permit rotation thereof without excitation and to permit control of the voltage output from the alternator by control of field current. The usual automobile alternator is self-excited and includes a built-in rectifier arrangement which can be modified by disconnection or eliminated by arrangement with the manufacturer of such alternators.

The three-wire output from the stationary armature 90 of the low voltage three-phase alternator 55, is converted to a two-phase three-wire supply at increased voltage by the Scott-connection transformer assemblage 56 as shown in the drawing. Such assemblage, as is well known in the art, includes two single-phase transformers 94 and 95, the secondary windings of which are connected at their one end to the tube motor leads 38 and 39, respectively, and at a common end to ground which serves as the third wire or lead to such tube motor. Transformer 94 has a primary winding connected at opposite ends between two of the three output wires from the alternator armature 90, the 0.866 tap on the primary of transformer 95 is connected to the third output wire from such armature, and a center tap on the primary of transformer 94 is connected to ground in common with one end of the primary of transformer 95. To improve the power factor of the tube motor, leads 38 and 39 are provided with suitable capacitors 110 and 111 connected to ground in parallel with windings 35 and 36.

In operation of the X-ray apparatus of the present invention, the taps 6 and 7 of transformer 8, the knob 21 of timer 16, and the knob 30 of filament control 24 are adjusted according to the desired kv., ma., and time desired for an X-ray exposure. If these selected operating conditions call for slow speed, 3000 r.p.m., rotation of the X-ray tube anode, the switches 46 to 50 of the selector switch means 45 will be in the slow-speed positions in which they are shown in the drawing. The line switches 11 and 12 will be closed to avail the transformer of a 220 volt, single phase, sixty-cycle, A.C. supply. All other switches will be positioned as shown, prior to start-up. Closure of the switches 11 and 12 will cause warmup of the timer 16 circuitry and the filament control 24 circuitry. The motor 88 will be inoperative and the rotating field 89 of the alternator 55 motionless, as a consequence of the open switch 50. Current will flow through the filament 3 of the X-ray tube in accord with the setting of the ma. selector knob 30. High voltage will not yet be appearing at the X-ray tube with the main switch 14 open in absence of depression of the exposure-initiating push button switch 20.

In preparation for effecting an X-ray exposure, the "Ready" push button switch 68 is depressed and held depressed. With switch 68 thus held closed, the exposure-initiating push button switch 20 is rendered effective via a line including the two switches in series, and the coil 69 is energized from transformer 8 via lead 18, the switch 68, a lead 115, and a branch of ground lead 17. The energized relay coil 69 closes switches 60 to 65. Thereupon the clock motor mechanism 78 of the start-up timing switch means 70 is energized from the transformer 8 by way of a branch of the 120-volt lead 18, a lead 117, the now-closed switch 60 and ground lead 17. At the same time; a 220-volt, 60-cycle, single phase lead 118 from transformer 8 becomes connected to the input terminal of the rotary switch 74 by way of the closed switch 48, a lead 119, the now-closed switch 63, and a lead 120; a 62-volt, 60-cycle, single-phase lead 121 from transformer 8 becomes connected to the input terminal of the rotary switch 72 via the closed switch 46, a lead 122, the now closed switch 61, and a lead 123; the rotary switch 73 becomes connected to a branch of the 62-volt, 60-cycle lead 121 by way of a lead 125, the now-closed switch 62, a lead 126 in series with a phase-shifting capacitor 127, and the closed switch 47; and the rotary switch 75 becomes connected to a branch of the 220-volt 60-cycle lead 118 by way of a lead 130, the now-closed switch 64, a lead 131 in series with a phase-shifting capacitor 132, and the closed switch 49.

Upon rotation of the rotary switches 72, 73, 74 and 75 by operation of the clock motor mechanism 78, switches 74 and 75 first close for a matter of several seconds to connect the 220-volt, 60-cycle, single-phase lead 120 and the phase-shifted 220-volt, 60-cycle lead 130 to branches of the tube motor leads 38 and 39 for rapid acceleration of the X-ray tube anode up to its selected operating speed of 3000 r.p.m. After such short interval, the clock motor mechanism 78 opens the rotary switches 74 and 75 and closes the switches 72 and 73 to disestablish the phase-shifted 220-volt operating circuit while establishing a 62-volt phase-shifted operating circuit for maintaining anode rotation at speed, by connection of the 62-volt, 60-cycle, single-phase, lead 123 to motor lead 39 and the phase-shifted 62-volt, 60-cycle lead 125 to tube motor lead 38. While the anode is thus rotating, an X-ray exposure may be initiated by depressing the exposure-initiating push button switch 20 while also maintaining the "Ready" push button switch 68 held depressed. In response to such closure of switch 20, the timer circuit means 16 will energize relay coil 15 to close the main switch 14 for the selected time to present high voltage to the X-ray tube for an exposure of such selected duration. Following the exposure, if only the push button switch 20 is released, it may be reclosed for subsequent exposures without awaiting anode rotation start-up. On the other hand, both switches are released when instant exposure availability is not required. Upon opening of the push button switch 68, the energizing circuit for the relay coil 69 opens the switches 60 to 64 to de-activate the clock motor mechanism 78 of switch means 70, and to interrupt the supply circuit for the X-ray tube motor to permit the anode 2 to coast to a stop. Upon de-energization of the clock motor mechanism 78, the rotary switches of switch means 70 will be returned by the spring 82 to the open positions in which they are shown in the drawing.

If, however, the kv., ma., and time selection determined by the positions of taps 6 and 7, knob 30, and knob 21, respectively, call for high speed operation of the X-ray tube 1, the tube speed mode selector switch means 45 will be actuated to close the switch 50 and to open the switches 46, 47, 48 and 49. Switch means 45 will then be in its high speed condition. Closure of switch 50 establishes a 120-volt energizing circuit for the motor 88 to rotate the field 89 of the alternator 55, which circuit can be traced from ground, through the motor, a lead 136, the switch 50, and a branch of the lead 18. At this time the alternator field 89 is not excited so that the motor 88 is operating without any significant load.

When it is desired to effect an exposure during high speed operation of the X-ray tube, the "Ready" push button switch 68 again is depressed, as in start-up for low speed operation. This again results in energization of the tube motor start-stop switch means 58, with consequent closure of switches 60 to 65. Closure of switch 60 again effects operation of the clock motor mechanism 78 of the start-up timing switch means 70; closure of switches 61 to 64 is of no consequence in view of the open switches 46 to 49, while closure of switch 65 effects energization of the already rotating field of the alternator 55 by way of a branch of the 120-volt lead 136, the switch 65, a lead 138, a current limiting resistor means which drops the voltage to about fifteen volts, a first-closing rotary switch 76 of switch means 70, a lead 142, a rectifier bridge 143, a ground-connected lead 144, and leads 145 and 146 connected to slip-ring terminals of such alternator field. Immediately upon such energization of its rotating field 89, the alternator 55 generates three-phase 180-cycle alternating current which appears in its three output wires 150, 151 and 152 and via the Scott-connection transformer assemblage 56 is converted to a two-phase, 220-volt, 180-cycle alternating current delivered via leads 38, 39 and ground to the tube motor for rapid acceleration of tube anode 2 up to about 10,000 r.p.m. Following this, after a lapse of several seconds, the clock motor mechanism 78 will have advanced the rotary switch 76 to an open position and the rotary switch 77 to a closed position which automatically introduces an additional field-current-reducing resistor 160 into the energizing circuit for the alternator field 89 to reduce the voltage supplied to the X-ray tube motor to about 100 volts, suitable for maintaining anode rotation at the 10,000 r.p.m. speed.

Following start-up and high speed rotation of the X-ray tube anode, the selected exposure may be effected as previously described by depression of the exposure-initiating push button switch 20 while maintaining the "Ready" push button switch 68 also closed.

Following completion of a selected exposure, both push button switches 20 and 68 may be released to terminate the exposure and return the switches 61 to 65 and 72 to 77 of switch means 45 and 58, respectively, to the positions in which they are shown in the drawing, as will be appreciated from previous description in connection with operation at low anode speed.

The opening of the switches 64 and 65 of switch means 58 will disestablish the energizing circuit for the alternator field 90 which will terminate output from the alternator. The field 90 will continue to be rotated in readiness by the motor 88, however, so long as switch means 45 remains in its high speed position with the line switches 11 and 12 also remaining closed.

In addition, to the foregoing, the apparatus of the present invention also includes relay switch means 170 and 171 for interrupting the tube motor leads 38 and 39 between the output of the Scott-connection transformer assemblage 56 and the tube motor when the system is conditioned for low speed operation as determined by the position of the tube speed mode selector switch means 45 as well as switches 180, 181, 182 and 183 for interrupting the tube motor leads 38 and 39 between the tube motor and rotary switches 72, 73, 74 and 75, when the system is conditioned for high speed operation as determined by switch means 45. Accordingly, the switches 170 and 171 are open in the low speed position of switch means 45 and closed in its high speed position, and switches 180 and 183 are closed in the low speed position of switch means 45 and are open in the high speed position. This is accomplished by inclusion of a switch 175 in the switch means 45 which controls establishment of an energizing circuit of an operating coil 176, which circuit includes a branch of the 120-volt lead 18, the switch 175, a lead 177, and a lead 178 to ground.

While there has been shown and described an illustrative embodiment of the invention, modifications thereto will readily occur to those skilled in the art. It is not desired, therefore, that the invention unnecessarily be limited to the specific arrangements shown and described and it is intended to cover in the appended claims all such modifications as fall within the true spirit and scope of the invention.

For example, the functions of the switch means 70 may be served by other forms of switching means, including such as gas-filled tube circuitry triggered after time delays imposed by resister-capacitor arrangements to control relay switches, etc.

I claim as my invention:

1. X-ray apparatus comprising an X-ray tube including a two-phase squirrel-cage-induction tube motor of rotating the anode of said tube, said tube motor being operable at one speed from a 60-cycle phase-shifted source and at another speed by a 180-cycle two-phase source, a 60-cycle phase-shifted source, a 180-cycle two-phase source including a lower voltage externally-excited three-phase alternator and a Scott-connection voltage-step-up transformer assemblage, an alternator-driving motor, a direct current field excitation source, tube speed mode selector switch means operable selectively to establish availability of said 60-cycle phase-shifted source for tube motor operation or to effect operation of said alternator-driving motor to render said 180-cycle two-phase source available for tube motor operation, tube motor start-stop switch means operable to effect connection of the tube motor to said 60-cycle phase-shifted source when selected by said mode selector switch means and to connect said field excitation source to the already-driven alternator to effectuate it for supply of two-phase 180-cycle current to the tube motor when selected for such operation by the mode selector switch means, and a source of power for operating said X-ray tube during rotation of its anode.

2. X-ray apparatus comprising a rotating anode X-ray tube including a two-phase motor for rotating the anode of said tube, a motor-operated three-phase alternator to generate 180-cycle three-phase output, a Scott-connection transformer assemblage for converting the three-phase output from said alternator to two-phase supply to said two-phase motor, and a source of power for operating said X-ray tube during rotation of its anode.

3. X-ray apparatus comprising a rotating anode X-ray tube including a two-phase induction tube motor for rotating the anode of said tube, a three-phase 180-cycle low-voltage alternator having an externally-excitable rotating field and a stationary armature having a three-phase output, an external excitation source for said rotating field, a field-rotator motor for driving said rotating field, means for converting the three-phase low-voltage output from said alternator armature to a two-phase higher-voltage for operating said tube motor, and a source of power for operating said X-ray tube during rotation of its anode.

4. X-ray apparatus as set forth in claim 3, further including means for exciting the rotating field of said alternator from said external excitation source at different energy levels to vary the output of said armature in accord with start-up and running-at-speed rotational conditions of the X-ray tube anode.

5. X-ray apparatus as set forth in claim 3, wherein said alternator has twelve poles and said field-rotor motor drives the alternator field at about 1800 r.p.m. to generate 180-cycle three-phase current, and the last recited means includes a Scott-connection transformer assemblage.

6. X-ray apparatus comprising an X-ray tube having a rotating anode driven by an induction anode-rotor motor, an alternator having an externally-excitable field and an armature for generation of 180-cycle alternating current for operating said induction motor, one or the other of said field and armature being a rotating component of said alternator, a drive motor for said rotating component, first means for effecting operation of said drive motor to place said alternator in readiness for generation of operating current for said anode-rotator motor, subsequently-operable means for effecting excitation of the alternator field to effectuate said alternator for such generation, and a source of power for operating said X-ray tube during rotation of its anode.

References Cited

UNITED STATES PATENTS

| | | | |
|---|---|---|---|
| 2,092,618 | 9/1937 | Bouwers | 250—103 |
| 2,557,901 | 6/1951 | Wiseman | 321—7 |
| 3,205,360 | 9/1965 | Graves | 250—93 |
| 3,244,884 | 4/1966 | McLaughlin | 250—93 |

RALPH G. NILSON, *Primary Examiner.*

A. L. BIRCH, *Assistant Examiner.*